Figure 17:
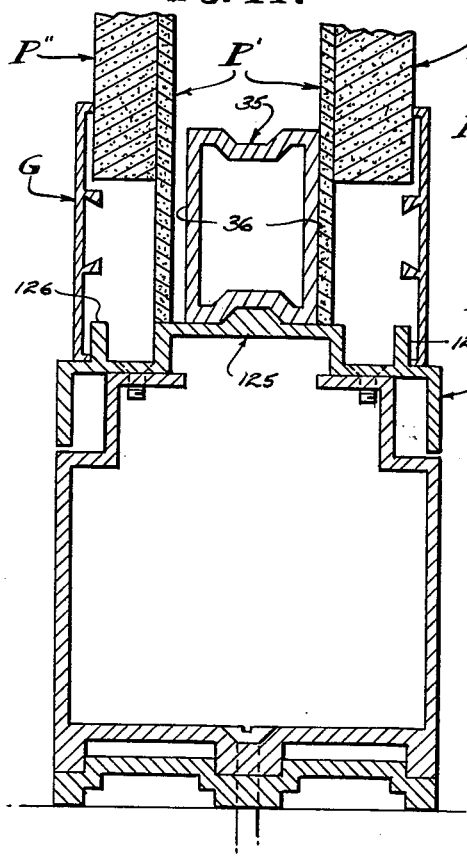

Feb. 26, 1963
C. A. FRICK
3,078,968
PREFABRICATED PARTITIONING
Filed Oct. 2, 1958
6 Sheets-Sheet 1
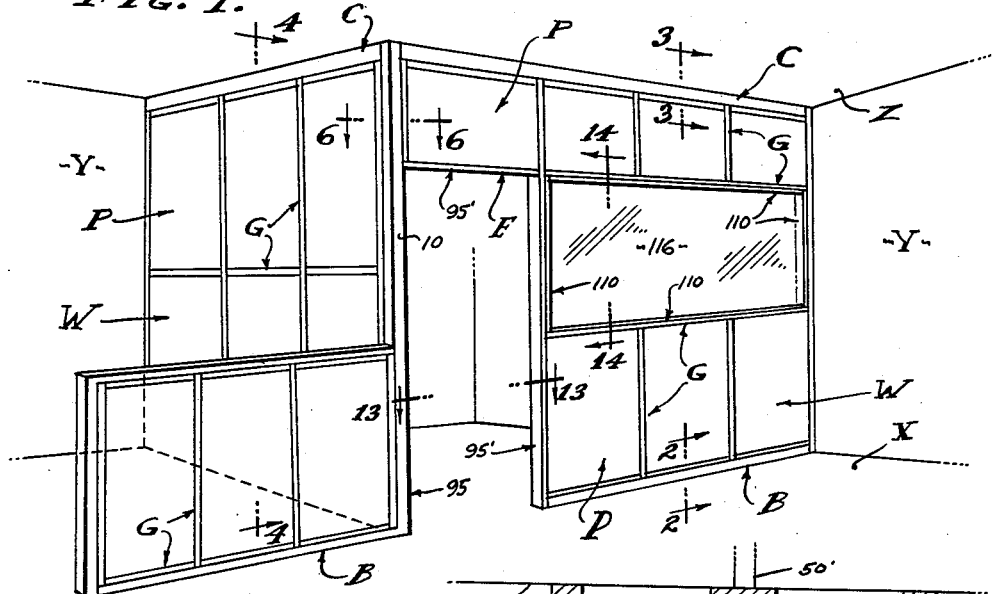
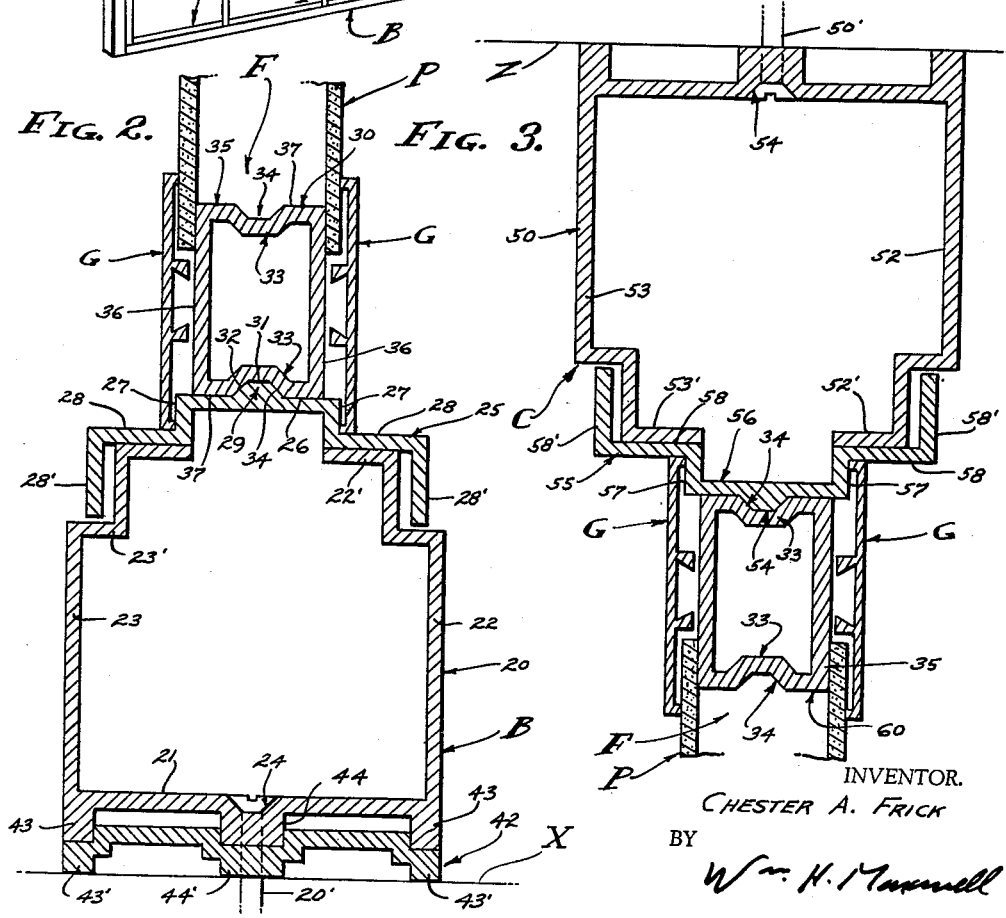
INVENTOR.
CHESTER A. FRICK
BY
Wm. H. Maxwell
AGENT

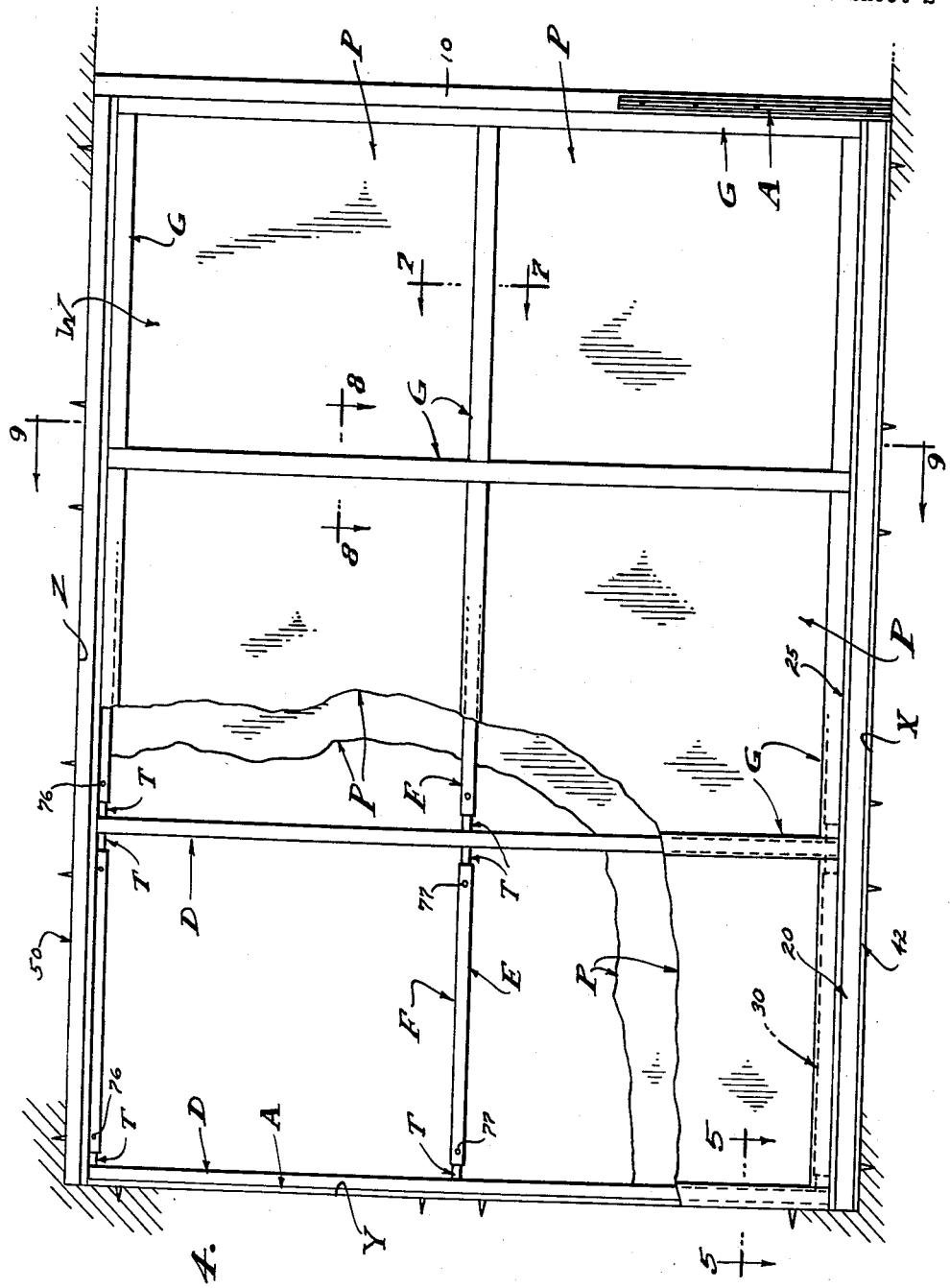

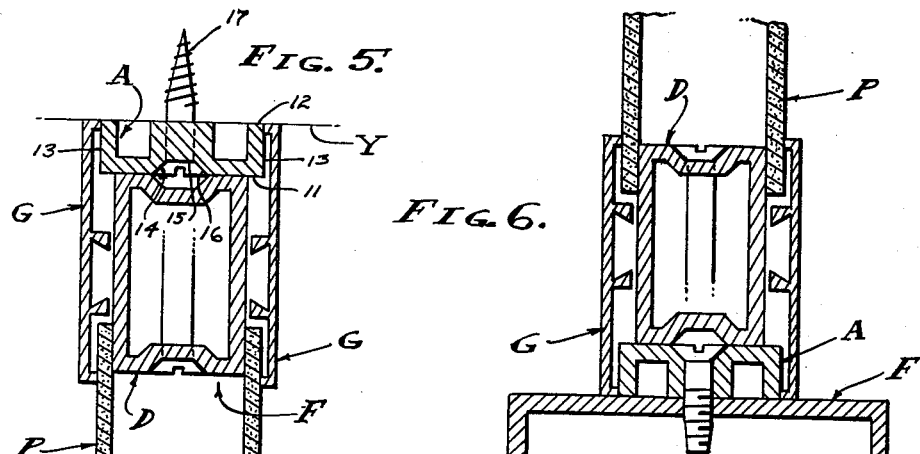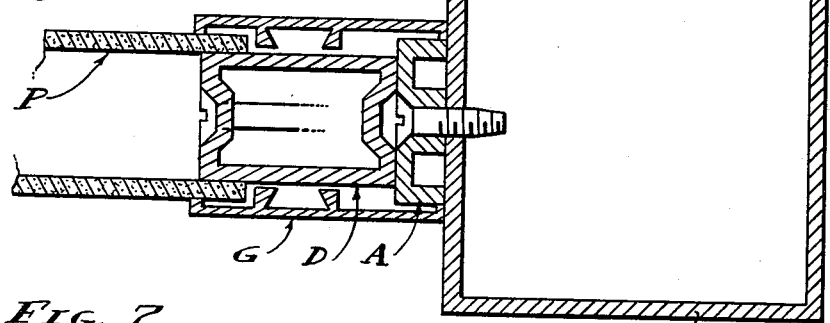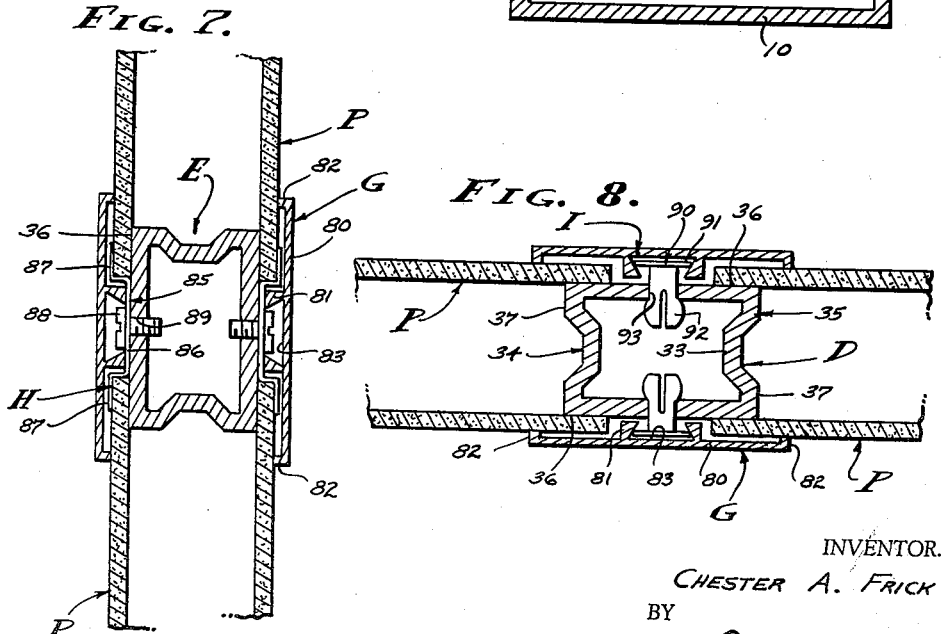

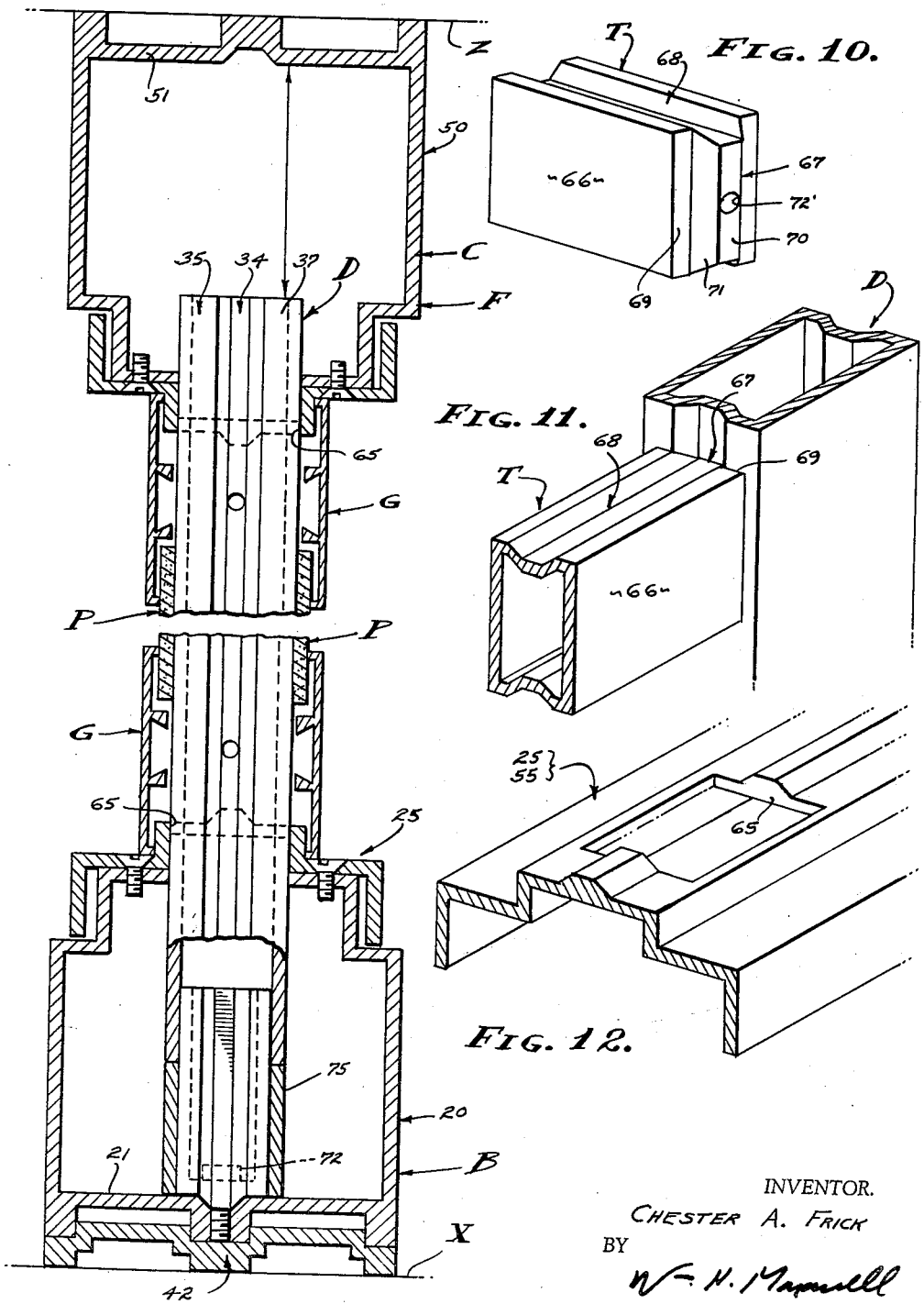

Feb. 26, 1963  C. A. FRICK  3,078,968
PREFABRICATED PARTITIONING
Filed Oct. 2, 1958  6 Sheets-Sheet 5
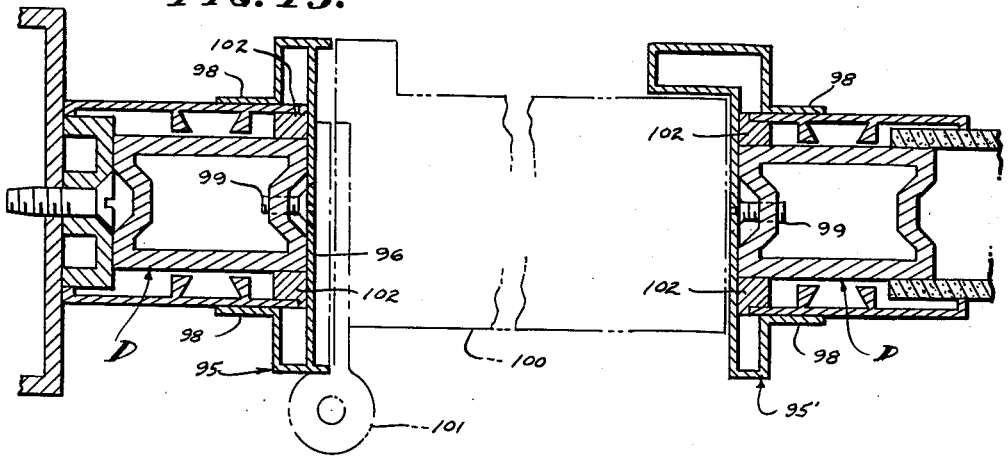
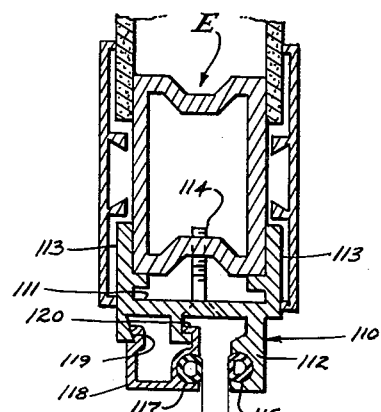
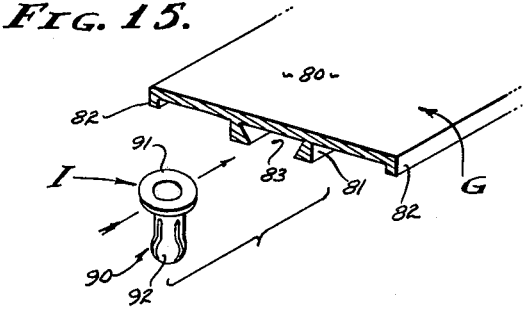
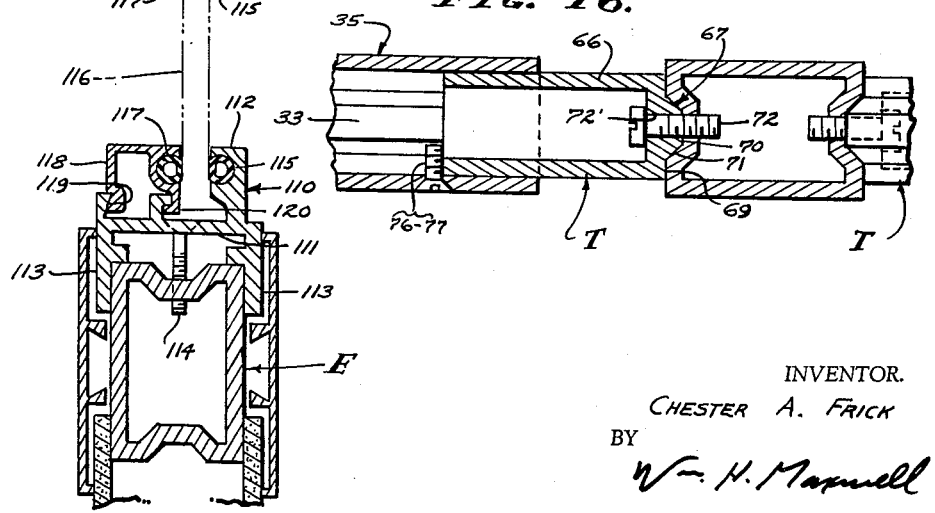
INVENTOR.
CHESTER A. FRICK
BY
Wm. H. Maxwell
AGENT Feb. 26, 1963

C. A. FRICK 3,078,968

PREFABRICATED PARTITIONING

Filed Oct. 2, 1958

6 Sheets-Sheet 6

INVENTOR.

CHESTER A. FRICK

BY

Wm. H. Maxwell

AGENT

United States Patent Office 3,078,968
Patented Feb. 26, 1963

3,078,968
PREFABRICATED PARTITIONING
Chester Allen Frick, Glendale, Calif., assignor to Harvey Aluminum (Incorporated), Torrance, Calif., a corporation of California
Filed Oct. 2, 1958, Ser. No. 764,786
2 Claims. (Cl. 189—34)

This invention relates to prefabricated partitioning and is concerned particularly with the construction of partition walls for use in, for example, office buildings and the like, it being a general object of this invention to provide a prebuilt wall construction that is easily and quickly erected and which also can be disassembled and the parts thereof used for re-erection of like partition walls.

Partitioning and wall construction have been widely employed for dividing large building floor areas into smaller usable areas adapted to individual offices. With each kind of business there are different requirements as to the division of space, and since the tenancy in a building, such as an office building, is subject to frequent change, there is the continuing necessity to replan and rebuild the divisions of floor space. That is, the temporary partitions are removed and replaced to the tenant's liking and specifications. However, the ordinary procedure of tearing down and replacing of partition walls is wasteful and it is costly.

Ready-made partitioning has been proposed and is available, but erection costs and appearance thereof are to be considered. Such structures are not only costly but they are obviously temporary from inspection of their appearance. Further, such structures are not ordinarily reusable and they are not expansible for flexibility of installation. Also, such structures do not always provide for thermal expansion, they do not always provide for service systems such as electrical conduits, and they do not provide for sound deadening, nor are they recognized as fireproof.

It is an object of this invention to provide an assembly of prefabricated components that are easily and quickly erected into a partition wall that is permanent in nature, and a partition wall that is equally easily and quickly dismantled, the components thereof being re-usable in erecting a like wall.

An object of this invention is to provide an assembly of prefabricated components that are erected into a wall that is permanent in nature and appearance.

It is also an object of this invention to provide a prefabricated partitioning that is expansible to fit any normal variations in building dimensions and which also provides for thermal expansion and contraction during installation and usage.

It is still another object of this invention to provide a prefabricated partitioning that is adapted to accommodate conduits for service connections, such as, for example, electrical and telephone lines or conduits.

It is also an object of this invention to provide a prefabricated wall that is considered fireproof in that it will withstand the severe tests and requirements established by municipal codes. In the structure that I provide, spaced panels of non-combustible mineral material are employed, making the structure as fireproof as possible.

An object of this invention is to provide a framework of prefabricated components that are adapted to be erected with a minimum of effort and which are adapted to receive any suitably selected decorative panel, as circumstances require.

Further, it is an object to provide a partitioning of the character thus far referred to that is versatile by the adaptation of posts at the ends and corners thereof, by the adaptation of door and window components, and by the adaptation of railings and the like, all of which will be apparent as the structure is hereinafter described.

Figure 20:
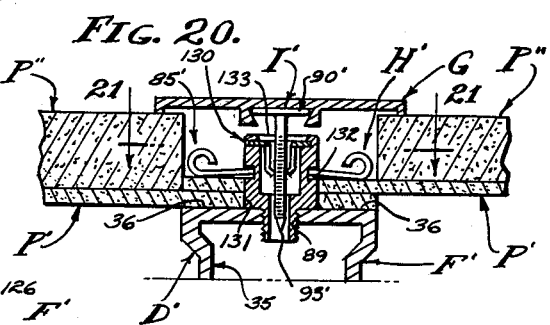
Figure 21:
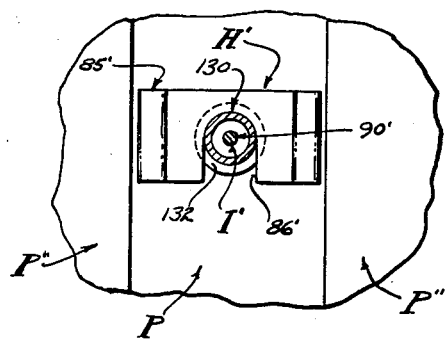
Figure 18:
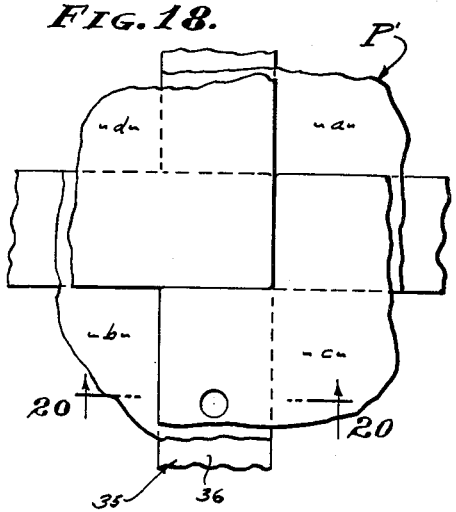
Figure 19:
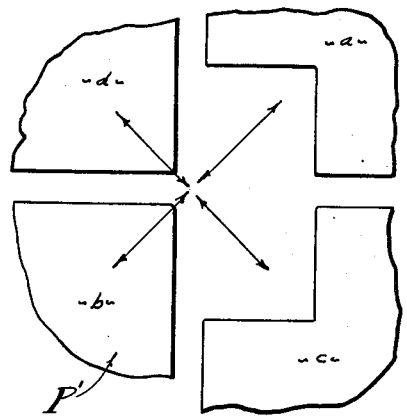

The various objects and features of my invention will be fully understood from the following detailed description of the typical preferred forms and applications of the invention, throughout which description reference is made to the accompanying drawings, in which:

FIG. 1 is a perspective view illustrating a typical assembly of components constructed and erected in accordance with the present invention. FIG. 2 is a sectional view taken as indicated by line 2—2 on FIG. 1 and shows the general relationship of parts at the base of the erected structure. FIG. 3 is a sectional view taken as indicated by line 3—3 on FIG. 1 and shows the general relationship of parts at the crown of the erected structure. FIG. 4 is a side view of one of the walls and taken as indicated by line 4—4 on FIG. 1. FIG. 5 is an enlarged sectional view taken as indicated by line 5—5 on FIG. 4. FIG. 6 is an enlarged sectional view taken as indicated by line 6—6 on FIG. 1. FIGS. 7 and 8 are enlarged sectional views taken as indicated by lines 7—7 and 8—8 on FIG. 4. FIG. 9 is a vertical sectional view taken as indicated by line 9—9 on FIG. 4. FIGS. 10, 11 and 12 are perspective views, FIG. 10 showing the tenon that I provide, FIG. 11 showing the tenon applied to a stud, and FIG. 12 showing the cap of the structure with an opening therein to receive a stud. FIGS. 13 and 14 are sectional views taken as indicated by lines 13 and 14 on FIG. 1. FIG. 15 is a perspective view showing the batten and fastener therefor, and FIG. 16 is a sectional view showing the installation of the tenon. FIGS. 17 to 21 of the drawings illustrate a second form of the invention, FIG. 17 being a sectional view similar to FIG 2, FIG. 18 being a side view of a portion of a wall, FIG. 19 being an exploded view of the panels shown in FIG. 18, FIG. 20 being a sectional view taken as indicated by line 20—20 on FIG. 18, and FIG. 21 being a sectional view taken as indicated by line 21—21 on FIG. 20.

The present invention contemplates the establishment of a commercially available partitioning to be offered in standardized types or models and adapted to receive any of wide variety of already commercially available paneling. Further, the widths, heights and floor plans of the partitioning herein disclosed are variable as particular circumstances require, and in practice accepted modular widths and heights are offered, the structure being adapted to any rectangular-shaped floor plan desired. In addition to the general arrangement, or plan, a wide variety of openings are available in the form of doors, windows and ventilating openings. As pointed out above, the construction involves spaced panels of material, so that the decor of the interior and exterior can be individually selected. Generally, the partition walls that I provide are erected with ordinary skill and without fabrication at the site of erection. That is, cutting, hammering, and the usual methods, including finishing and painting, are all eliminated during erection and the partitioning is assembled and erected without confusion and without distracting noise.

A general objective of the present invention is to employ decorative materials in the construction of partition walls W, that is, materials are used for both the frame F and panels P that are ornamental and pleasing in appearance. As shown in FIG. 1 of the drawings, there is a building compartment or chamber involving a floor X, walls Y and a ceiling Z. The floor X and ceiling Z are in spaced horizontal planes while the walls Y are angularly related and extend vertically between the floor and ceiling. In FIG. 1 of the drawings the partition walls W are shown extending between the floor X and ceiling Z in which case the components of the wall W are fabricated to fit between said floor and ceiling. In actual practice, the height of ceilings is standardized, for example, in increments of one foot between eight and eleven feet. However, it is to be understood that the partition walls W can be free standing, say, for example, seven feet in height, in which case the crown or top of the wall W is spaced from the ceiling Z, and so that the partitioned enclosure opens upwardly.

The partition walls W are essentially alike and they are adapted to extend adjacently between vertical elements A. The elements A can be applied to walls, end post or corner posts, or the like. The walls W involve, generally, a base B, a crown C, stud D and rails E when so desired. In addition to the general elements above referred to, the wall W involves components in the form of structural elements, all as later described.

In FIG. 4 of the drawings I have illustrated a typical embodiment of the present invention involving the base B and crown C that extend horizontally between vertical elements A, studs D that extend vartically between the the base B and crown C, and rails E that extend horizontally between the stud D. In addition to the foregoing elements that form the frame F, the panels P are carried by the frame F composed of the elements A, B, C, D and E, there being battens G to overly adjacent edge portions of the panels P and to decorate the finished structure. Further, an important feature of construction is the tenons T that I provide in order to position the parts of the wall W relative to each other and to key said parts in assembled condition.

In FIGS. 1 and 4 of the drawings, the wall W is shown extending between the wall Y and the post 10, and between the floor X and ceiling Z. The post 10 extends vertically between the floor and ceiling and is perferably a straight element square in cross-section. As shown, the post 10 is tubular and it can be secured in position by suitable fastening means, although it is not necessary to fasten the post 10 in position.

The elements A that are applied to the walls Y and posts 10, or the like, are vertically disposed elements that are adapted to the anchored to the walls Y or post 10, as the case may be, in order to support or tie together the various other elements of the structure, as later described. The element A is a straight elongate structure of uniform cross-section particularly adapted to be formed by the process of extrusion, for example, of aluminum or the like. As best illustrated in FIG. 5 of the drawings, the element A involves a body of material rectangular in cross-section with a flat front 11, a flat back 12, flat sides 13 and characterized by a channel 14. The channel 14 is formed in the body of the element A from the front 11 thereof and is coextensive with the longitudinal extent thereof. As shown, the channel 14 has a flat bottom 15 in a plane space from the front 11 and it has outwardly slanted sides 16 angularly related at 82° relative to each other in order to receive flat headed screw fasteners. The said elements A are applied to the walls Y and posts 10 to have flat engagement of the back 12 thereof and are secured in working position by means of screw fasteners 17.

The base B is a supporting member applied at the lower edge of the walls W and extends horizontally along the floor X between the spaced vertical elements or wall and post to which the elements A are applied as above specified. The base B is adapted to be anchored to the floor X and involves, generally, a bottom channel 20, a cap 25 and a bottom rail 30. The bottom channel 20, cap 25 and bottom rail 30 are each straight elongate elements of uniform cross-section particularly adapted to be formed by the process of extrusion, for example, of aluminum, or the like.

As shown in FIG. 2 of the drawings, the bottom channel 20 involves a base plate 21, inner and outer upstanding walls 22 and 23, and inwardly turned flanges 22' and 23' carried by the walls 22 and 23, respectively. The said plate, walls and flanges are parallel with each other, the two said flanges being spaced and in a common plane. Further, the bottom channel 20 is characterized by a channel 24 formed in the base plate 21 and coextensive with the longitudinal extent of the bottom channel 20. As shown, the channel 24 is the same in cross-section as the channel 14, above described, and has a flat bottom and slanted sides in order to receive flat headed screw fasteners. The said bottom channel 20 is applied to the floor X to have flat engagement therewith and is secured in working position by means of screw fasteners 20'.

As shown in FIG. 2 of the drawings, the cap 25 involves a plate 26 that overlies the opening that occurs between the flanges 22' and 23' of the channel 20. The cap 25 is carried by the flanges 22' and 23' and is provided to support the bottom rail 30. The plate 26 is wide enough to accommodate both the bottom rail 30 and the opposite panels P, there being spaced shoulders 27 to receive and position the battens adjacent the outside faces of the panels P. As indicated, the plate 26 has lateral extensions 28 that have flat bearing engagement on the upper faces of the flanges 22' and 23', it being understood that shims (not shown) can be applied therebetween to gain accurate alignment, as circumstances require.

In the preferred form, the cap 25 has a depending skirt 28' at each margin thereof to extend downwardly to overlie the joint between the bottom channel 20 and cap 25. The channel 20 is shown with notches or recesses to receive the skirt 28' with suitable clearance. Further, the cap 25 is characterized by a key 29 formed on the plate 26 and coextensive with the longitudinal extent of the element. As shown, the key 29 has a flat top 31 and it has inwardly slanted sides 32 angularly related, at 82° relative to each other, in order to be received in a mating channel in the bottom rail 30. The key 29 is centrally located and thereby centrally locates the rail 30.

As shown in FIG. 2 of the drawings, the bottom rail 30 is of the same cross-sectional configuration as the studs D, rails E and top rail later described. That is, these several elements of the wall W are formed of the same extruded body 35 which is rectangular in cross-section with opposite sides 36 and opposite faces 37. The body 35 is tubular and is characterized by channels 34 formed in the faces 37 and by one or more inner keys 33. The channels 34 have flat bottoms and outwardly slanted sides in order to receive the keys 24 projecting for the bottom cap 25 (or top cap later described) centrally locating the bottom rail 30. The inner keys 33, preferably two opposite keys as shown, have flat tops and inwardly slanted sides in order to have mating engagement with the tenons T, later described.

In addition to the foregoing, I have provided a filler 42 to be employed with the base B when it is desired to lift the base. The filler 42 is essentially a shim element made the same width as the bottom channel 20. In the case illustrated, there is a leg 43 depending from each side of the base plate 21 and also a leg 44 depending from the center thereof. In this case, the filler 42 has corresponding recesses 43' and 44' to receive the said legs, and further, the filler 42 has corresponding legs 43" and 44" of its own and depending therefrom. It will be apparent that one or more fillers 42 can be employed between the floor X and base plate 21 of the base B. As shown, the fasteners 20' are applied into the floor X through both the base plate 21 and the filler 42.

The crown C is a supporting member applied at the upper edge of the wall W and extends horizontally along the ceiling Z between the spaced elements or wall and post to which the elements A are applied, as above described. The crown C is adapted to be anchored to the ceiling Z and involves, generally, a top channel 50, a cap 55 and a top rail 60. The top channel 50, cap 55 and top rail 60 are, each, straight elongate elements of uniform cross-section particularly adapted to be formed by the process of extrusion, for example, of aluminum, or the like.

As shown in FIG. 3 of the drawings, the top channel 50, which is essentially the same as the bottom channel 20, involves a top plate 51, inner and outer depending walls 52 and 53, and inwardly turned flanges 52' and 53' carried by the walls 52 and 53, respectively. In practice, the channels 20 and 50 are identical in cross-section. The said plate, walls and flanges are parallel with each other, the two said flanges being spaced and in a common plane. Further, the top channel 50 is characterized by a channel 54 formed in the top plate 51 and coextensive with the longitudinally extent of the top channel 50. As shown, the channel 54 is the same in cross-section as the channels 14 and 24, above described, and has a flat bottom and slanted sides in order to receive flat headed screw fasteners. The said top channel 50 is applied to the ceiling Z to have flat engagement therewith and is secured in working position by means of screw fasteners 50'.

As shown in FIG. 3 of the drawings, the cap 55, which is essentially the same as the cap 25, involves a plate 56 that overlies the opening that occurs between the flanges 52' and 43' of the channel 50. In practice, the caps 25 and 55 are identical in cross-section. The cap 55 is carried by the flanges 52' and 53' and is provided to support the rail 60. The plate 56 is wide enough to accommodate both the top rail 60 and the opposite panels P, there being spaced shoulders 57 to receive and position the battens G adjacent the outside faces of the panels P. As indicated, the plate 56 has lateral extensions 58 that have flat bearing engagement on the upper faces of the flanges 52' and 53', it being understood that shims (not shown) can be applied therebetween to gain accurate alignment, as circumstances require.

In the preferred form, the cap 55 has upstanding skirts 58' at each margin thereof to extend upwardly to overlie the joint between the top channel 50 and cap 55. The channel 50 is shown with notches or recesses to receive the skirts 58' with suitable clearance. Further, the cap 55 is characterized by a key 54 formed on the plate 56 and coextensive with the longitudinal extent of the element. As shown, the key 54 has a flat top and it has inwardly slanted sides angularly related, at 82° relative to each other, in order to be received in a mating channel in the top rail 60. The key 54 is centrally located and thereby centrally locates the rail 60.

As shown in FIG. 3 of the drawings, the top rail 60 is of the same cross sectional configuration as the bottom rail 30 and studs D and rails E. That is, the top rail 60 is formed of the extruded body 35 above described, and has keys 33 and channels 34, said channels being engaged with the keys 54 to position the top rail 60 centrally of the cap 55.

In order to erect a simple wall W, as illustrated in FIG. 4 of the drawings, the parts and elements thus far described are assembled and installed as follows: The two opposite vertically disposed elements A are applied to the wall Y and post 10 by employment of any suitable fastening means, for example, with the screws 17. The base B and crown C are applied to the floor X and ceiling Z by fastening the channels 20 and 50 with the screws 20' and 50'. A filler 42 can be inserted at the base B as above described, and can also be inserted at the crown C if so desired. With the four sides of the wall W now established, the caps 25 and 55 and rails 30 and 60 are placed in their respective positions and fastened to their respective channels 20 and 50 by means of screw fasteners 63 and 64 (see FIG. 9). The parts and elements assembled to the extent thus far described form a foundation upon which to complete the frame F of the wall W.

As shown throughout the drawings, the studs D, which are vertically disposed elements, are of the same cross-sectional configuration as the rails 20 and 30 and are formed of the same extruded body 35 which is rectangular in cross-section with opposite sides 36 and opposite faces 37. The channels 34 and keys 33 in the studs D are adapted to receive the tenons T, later described, the studs D being entered into the base B and crown C to engage tenons and so that the studs extend vertically and parallel with each other in spaced relationship. Therefore, the caps 25 and 55 as illustrated in FIG. 12, are perforated with suitably spaced openings 65 each adapted to pass the body 35 of the stud D. As best illustrated in FIG. 9 of the drawings, the lower end portion of the stud D enters the base B through the opening 65 in the cap 20 while the upper end portion of the stud D enters the crown C through the opening 65 in the cap 30. As shown, the stud D is shorter in length than the distance between the plates 21 and 51 of the installed base B and crown C, to the end that the stud D can be entered through one cap and then through the other by sifting the stud D vertically.

In accordance with the present invention, there is provided means for positioning and keying the elements of the frame F in working position. This means involves the tenon T as best shown in FIGS. 10, 11 and 16, that is adapted to locate itself centrally of the base B (or crown C), of the studs D and of the elements A, and which is adapted to engage and/or carry the studs D and rails E. The tenon T involves a body 66 of metal such as aluminum or the like, said body including positioning means 67 for locating the body 66 on a supporting element of the frame F, either the base B, crown C, studs D or elements A. The tenon T is an elongate element adapted to be fixedly mounted and to enter the end portion of the body 35, the body 66 thereof being rectangular in cross-section and proportioned to slidably enter the open ends of any one of the bodies 35 that are employed. Further, the body 66 is characterized by opposite channels 68 that slidably receive the keys 33.

The means 67 for locating the tenons T involves a key that is received in any one of the channels 14, 24, 34 or 54 as desired. The body 66 has an end 69 in a plane normal to the longitudinal axis thereof and the key of the means 69 is formed on the end 69 to project therefrom. The key has a flat top 70 and slanted sides 71, related 82° to each other, in order to be received in the channels above described. In practice, the body 66 is shell-shaped and opens at one end, the end 69 closing the other end. As shown, the body 66 is secured in the selected working position by means of a fastener 72, for example, a screw fastener that extends through an opening 72' to threadedly engage in an opening in the supporting element.

The frame F with the studs D is completed by employing the tenons T, as follows: As shown, in FIG. 9, a tenon T is secured in the base B by a fastener 72 and is centered by the channel 24. A positioning sleeve 75 is engaged over the tenon T to hold the studs D properly elevated when the end portions thereof are entered through the openings 65 in the caps 25 and 55. Tenons T are applied to the faces 37 of the studs D so that the keys on the tenons enter the channels 34 in the studs, centrally locating the tenons. In practice, a tenon T is employed at each point where a top or bottom rail 30, or 60, abuts the face 37 of a stud (see FIG. 4). In carrying out the invention, the rails 30 and 60 are shorter in length than the distance between studs D so that they can be aligned with opposed tenons T, and then slidably engaged over one tenon T and then the other tenon T. There is enough clearance and flexibility to permit of this consecutive engagement of the two opposite tenons T, and when the rail, 30 or 60, is properly positioned it is held by pins or screw fasteners 76. The parts assembled as thus far described form the basic frame F.

In addition to the foregoing, the frame F may include the rails E that are intermediate rails extending horizontally between the studs D. The rails E are of the same cross-sectional configuration as the rails 30 and 60 and studs D, and are formed of the extruded body 35 above described. The rails E, like the rails 30 and 60, are shorter than the distance between studs D so that they can be aligned with opposed tenons T, and then slidably engaged over one and then the other. When the rails E are in proper position they are held by a pin or fastener 77.

The panels P are applied to opposite sides of the frame F to engage with opposite sides 36 of the bodies 35 forming the studs and various rails. The said bodies 35 hold the panels P in spaced relationship and have flat engagement with the marginal portions of the panels P. In accordance with the invention, any suitable panel P may be selected and employed. However, for fireproofing a panel P of inorganic material, such, as for example, gypsum, is employed. Such panels are commercially available in a wide variety of surface finishes and to the end that the wall W is actually a completed wall when the panels P are finally installed.

Installation of the panels P is accomplished by employing the battens G that I provide. As best illustrated in FIGS. 7, 8 and 15 of the drawings, the battens G are continuous strips that overlie the joints occurring between adjacent edges of the panels P. As clearly indicated in FIGS. 1 and 4, the vertically disposed battens G extend between the base B and crown C while the horizontally disposed battens G extend between the said vertical battens. In the form of the invention now under consideration the edges of the panels P are spaced apart leaving a substantial gap therebetween and exposing the center portion of the side 36 of the body 35, and the battens G cover said gap. The battens G that I provide cooperate with anchoring means I, later described, and involve a flat elongate strip 80 with a coupler portion 81 and marginal flanges 82. The coupler portion 81 is centrally located to project from the inner side of the strip 80 to enter between adjacent panels P and is coextensive with the strip. An undercut or dovetailed channel 83 opens inwardly of the portion 81 for purposes later specified and the flanges 82 are turned inwardly at the opposite margins of the strip 80 to engage with the outer surfaces of the panels P. It will be apparent that the battens G are adapted to be formed as by the process of extrusion.

I provide fastening means H (see FIG. 7) that anchors the panels P in position on the frame F and which means involves a clip 85 that is secured to the bodies 35 of the frame and engages over the margins of the panels to hold them in place. The clip 85 is preferably a spring clip made of steel and has a flat center 86 to seat on the side 36 of the body 35 and has a pair of oppositely extending ears 87 offset from the center 86 and to overlie the panels P, as shown in FIG. 7 of the drawings. A suitable screw fastener 88 is threadably engaged through the center of the clip and into openings 89 in the side 36 of the stud or rail, as the case may be, and the ears 87, that are initially turned toward the panels, are deflected so that the panels are urged into pressured engagement with the frame F. Suitably spaced openings 89 are provided in the frame F in order to receive fasteners 88 to properly and adequately secure the panels in place as desired.

The anchoring means I that I provide (see FIG. 8) secures the battens G in place over the gap between the panels P and involves a snap-fastener 90 with a head 91 engaged in the channel 83 of the batten G and with a nose 92 adapted to be frictionally engaged in openings in the studs and rails. As shown in FIG. 8 of the drawings, the fastener 90 is a simple cylindrically shaped shell with an outwardly turned flange forming the head 91 and with an enlarged end that is bifurcated or split and forming the nose 92. The said head 91 is slidably engaged in the undercut channel 83 as indicated in FIG. 15, and the nose compresses to enter into an opening 93 in the side 36 of the body 35. Suitably placed openings 93 are provided in the frame F in order to properly and adequately anchor the battens G in place.

From the foregoing it will be apparent how the panels P are positioned and secured to the frame F by installing the clips 85 of the means H and how the battens G are easily installed by simply snapping the anchor fasteners 90 of the means I into the openings 93. In practice, the fasteners 90 have an inward pulling action so that the strips 80 are pulled into pressured engagement with the outer faces of the panels P. Further, the flanges 82 space the strips 80 from the faces of the panels P so that the ears 87 of the clip 85 are accommodated (as shown).

In addition to the simplified wall W, as illustrated in FIG. 4, I contemplate the incorporation of doors and windows as illustrated in FIG. 1 and shown in detail in FIGS. 13 and 14, respectively. In order to establish a door opening in the wall W (see FIG. 13), two studs D are suitably spaced and extend between the base B and crown C in the manner above described. A rail E is then installed between the pair of studs D in the manner above described employing opposed tenons T. With the studs D and rail E assembled a door jamb is ready to be applied, the door jamb being formed of straight elements of uniform cross-section formed as by extrusion of aluminum, or the like. In practice, I provide a hinge jamb 95 having a facer 96, and a stop jamb 95' having an additional stop 97. The jambs 95 and 95' have a pair of flanges 98 to overlie the panels P at or surrounding the door opening, acting to position the door jambs 95 and 95' centrally of the studs D, and of rail E that forms a header, there being a jamb 95 at one of the two spaced studs and a jamb 95' at the other stud and at the rail E, as shown. Suitable screw fasteners 99 can be employed to secure the jambs in position, said jambs being adapted to receive a door 100 and the necessary hardware in the usual manner, for example, hinges as indicated at 101. When the door jambs 95 and 95' are installed, it is necessary to trim one margin of the batten G, at the door opening, and in this case a spacer 102 is employed to support the batten, as shown.

In order to establish a window opening in the wall W (see FIG. 14), a pair of studs D are suitably spaced and extend between the base B and crown C in the manner above described. Rails E are then installed between the pair of studs, in the manner above described, there being spaced upper and lower rails. The upper rail forms a header while the lower rail forms a sill, and a window jamb 110 is ready to be applied. The window jamb 110 is formed of a straight element of uniform cross-section, formed as by extrusion of aluminum, or the like, and having facers 111, a stop 112 and a pair of flanges 113 to overlie the bodies 35 at or surrounding the window opening. The flanges 113 act to position the window jambs 110 centrally of the studs D and rails E. Four jambs 110 are related in a rectangular pattern and are secured in position by suitable screw fasteners 114. As shown, the jambs 110 include a seal 115 at the stop 112 that engages the window glass 116, and also include a seal 117 that is pressed into engagement with the glass 116 by means of a retainer 118 that is engaged into a channel 119 formed in the facer 111. The channel 119 is undercut to hold the retainer 118, as shown. Further, a hooked flange 120 aids in holding the retainer in place. Although a single type of window is shown, it is to be understood that various types of jambs may be employed in order to adapt the wall W to receive any desired type of window, as circumstances require.

On sheet six of the drawings I have illustrated a second form of the present invention that involves multiple layers of paneling, for the purpose of fire-proofing. As clearly shown in FIG. 17 I can provide a lamination of panels P' and P'', the panels P' being innermost and overlapped with each other, the outer panels P'' being decoratively surfaced panels. In the form of the invention now under consideration, the frame F' is the same as the frame F above described, except for the cross-sectional configuration of the caps 25 that cover the channels at the base and crown of the structure. The caps 125 are simply wider in order to accommodate the thicker panels, and also include stop ribs 126 that position the battens. In this second form, the panels P' overlap where they are engaged over the studs D' (see FIG. 20) and rails E' (and rails at the base and crown of the structure), and fastening means H' is provided in order to secure the overlapped panels. The anchoring means I' is essentially the same as the means I above described.

The panels P' and P" are secured one to the other in laminar form, each laminate being of rectangular configuration to occupy a portion of the frame F' defined by the spacing of the studs D' and rails E'. The panels P' and P" are secured to cemented together with the marginal portions of the panels P' exposed by spacing back of the edges of the panels P". Thus, the panels P' have flat coextensive engagement with the sides 36 of the bodies 35 and the edges of adjacent panels P" are spaced apart leaving a gap as above described.

In order to have effective lapping of the panels P' at the corners thereof, and where the studs and rails intersect, I have notched the panels so that the corner of one panel is accommodated in a recess in a diametrically opposite panel. In carrying out this feature of the invention, a pair of panels at each intersecting area is recessed while a pair is left square. For example, referring to FIGS. 18 and 19 of the drawings, a panel $a$ is recessed to receive the corner of a panel $b$, the said panels $a$ and $b$ having engagement with the sides 36 of the bodies 35, and a panel $c$ is recessed to receive the corner of the panel $d$, the said panels $c$ and $d$ having lapped engagement with the panels $a$ and $b$.

With the panels P' in lapped engagement as above described, it is necessary to employ panels P" of varying thickness. That is, a thick panel P" is applied to the inner panels $a$ and $b$, while a thin panel P" is applied to the outer panels $c$ and $d$. By employing the thicknesses of panels as described, it is possible to have coplanar ornamental surface at the outer faces of the wall.

In order to install the panels P' and P" I employ the fastening means H' that involves a post 130 that is threadedly engaged in the openings 89 in the sides of the bodies 35. The post 130 projects freely through openings 131 in the marginal portions of the panels P' and has a peripheral groove 132 adapted to receive and position a clip 85'. The clip 85' is a spring clip initially formed with an arcuate body and has a lateral opening 86' therein to engage in the groove 132 in the post (see FIG. 21). It will be apparent how the posts position the panels P' and how the clips 85' anchor the panels to press them into engagement with the frame F'.

The anchor means I' is essentially the same as the means I above described; however, in the form of invention now under consideration, the fastener 90' is engaged with the post 130. That is, the post receives the nose 93' of the fastener, the post being tubular in form and with a bore adapted to receive the fastener. In practice, I employ a fastener 90' that has a straight serrated nose 93' and I employ a spring grip 133 with fingers that engage the said serrations, or the like. It will be apparent how the grip 133, which is held in the said bore as by staking, acts to anchor the battens G when they are pressed into place.

With the parts and elements of construction as above described, the components of a wall are prefabricated in modular dimensions and are supplied in a knock-down condition. In particular, the frame F, or F', is made up and packaged, according to specification, the extent of the wall being determined by the height and length required, all as particular circumstances require. However, regardless of the particular dimensions and number and arrangement of panels required, the construction of the base B, crown C and the cooperative relationship of the bodies 35 forming the rails 30, 60 and E and forming the studs D remains exactly as above described. Therefore, the relatively few extruded sections that I provide can be prepared and assembled to form an infinitely wide variety of wall constructions.

From the foregoing, it will be apparent that I have provided a partitioning structure that is easily and quickly erected and which is of rugged and reliable construction. The spaced walls that I provide establish a void that results in the deadening of sound, and the overlapping of panels P' that I provide completely covers the frame with a fireproof panel so that the frame is not exposed to heat in case of fire. The frame F is extremely flexible in the sense that it is adaptable to variations in height, length and levelness in the building to which it is applied, and further, the spaced panels (as overlapped) allow for said variations, the battens G acting to cover the gaps between panels. If and when it is desired to dismantle the wall, it is a simple matter to strip the battens G from position and to remove the parts and elements without destroying them or injuring them in any way. Thus, the parts and elements that I provide are usable in the reconstruction of walls and are not wasted when changes in floor plans are required.

Having described only the typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A partition wall of the character described and including, a base and a crown in spaced relation with each other, a frame comprising spaced vertically disposed studs and horizontally disposed rails carried by the base and crown, panels carried by the frame and with adjacent edge portions thereof overlapped, the innermost panel being engaged with the frame parts, and means anchoring the panels to the frame and comprising a post projection from a frame part and through registering openings in the overlapped channel portions, and a clip engaged with the post and securing the panels in position.

2. A partition wall of the character described and including, a base and a crown in spaced relation with each other, a frame comprising spaced vertically disposed studs and horizontally disposed rails carried by the base and crown, panels carried by the frame and with adjacent edge portions thereof overlapped, the innermost panel being engaged with the frame parts, and means anchoring the panels to the frame and comprising a post projecting from a frame part and through registering openings in the overlapped panel portions, and a clip engaged with the post and securing the panels in position, and battens overlying the marginal portions of the panels and secured to the post.

References Cited in the file of this patent
UNITED STATES PATENTS

| 1,706,470 | Swanson | Mar. 26, 1929 |
| 1,982,104 | Holdsworth | Nov. 27, 1934 |
| 2,054,189 | Bemis | Sept. 15, 1936 |
| 2,291,913 | Nicholai | Aug. 4, 1942 |
| 2,325,694 | Marshall | Aug. 3, 1943 |
| 2,649,172 | Allen | Aug. 18, 1953 |
| 2,808,136 | Hammittt et al. | Oct. 1, 1957 |

FOREIGN PATENTS

| 1,141,681 | France | Mar. 18, 1957 |